J. C. UNDERWOOD.
Peanut Cleaner.
No. 81,562.
Patented Aug. 25, 1868.
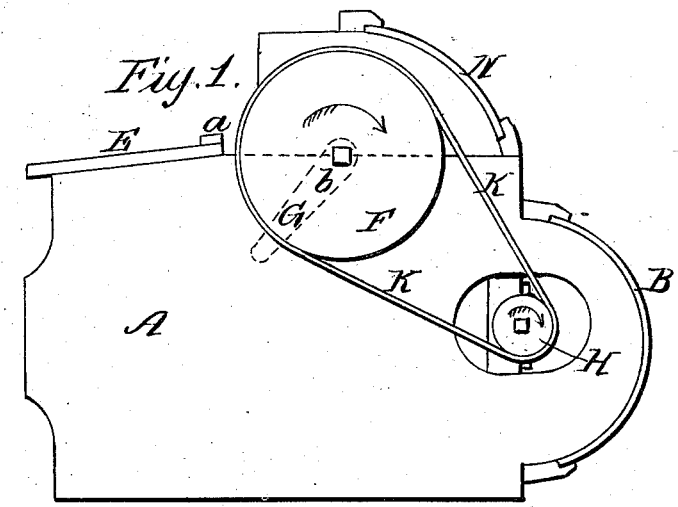
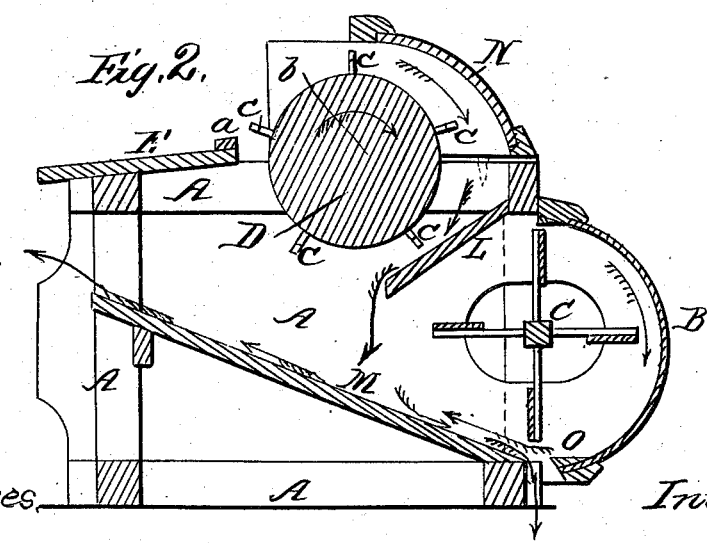

United States Patent Office.

JAMES C. UNDERWOOD, OF SURRY COURT-HOUSE, VIRGINIA.

Letters Patent No. 81,562, dated August 25, 1868.

IMPROVEMENT IN MACHINE FOR PICKING AND CLEANING PEANUTS.

*The Schedule referred to in these Letters Patent and making part of the same.*

TO ALL WHOM IT MAY CONCERN:

Be it known that I, JAMES C. UNDERWOOD, of Surry Court-House, in the county of Surry, and State of Virginia, have invented an Improved Machine for Picking and Cleaning Peanuts; and I do hereby declare that the following is a full, clear, and exact description of the construction and operation of the same, reference being had to the accompanying drawings, making a part of this specification, in which—

Figure 1 is a side elevation, and
Figure 2 is a central longitudinal vertical section.
Like letters in the two figures of the drawings indicate like parts.

Nature.

My invention consists of a machine having a cylinder provided with longitudinal parallel rows of teeth for separating the nuts from the vines, and having a fan and proper aprons for cleaning and gathering the nuts.

Construction.

To enable others skilled in the art to make and use my machine, I will proceed to describe its construction and operation.

I construct a frame, A, with a drum-end, B, in which operates the fan C, similar to an ordinary fanning-mill D is a cylinder about three (3) feet long and one and a half (1½) feet in diameter, provided with five parallel rows of teeth, $c\ c\ c\ c\ c$, arranged longitudinally with the cylinder, which rests and operates on proper axles in bearings on the top of the frame A, about two feet from the back end thereof, to allow the space for the platform E, which is provided with the guard $a$. The cylinder-axle is made with a square-shaft, $b$, which extends through and holds the driving-wheel F and crank G, by which the machine is operated. The pulley or small wheel H is attached to the axle of the fan-wheel, for operating the fan, by means of the band K.

The teeth $c\ c\ c\ c\ c$ are made of one-fourth (¼) inch rod iron, are placed three-eighths (⅜) of an inch apart, and project three (3) inches beyond the surface of the cylinder, and are sharpened at the ends, to avoid the liability of tearing the vines in two, if the ends were left square, and to enable the vines to pass more readily between the teeth.

L represents an apron extending under the cylinder and over the fan-wheel, for conducting the nuts, after being separated from the vines, to a position where the wind from the fan will strike them properly. The guard $a$ is for protecting the hands from the teeth while feeding the machine.

M is a bottom apron, placed at any required inclination, for conducting the sound nuts to the front of the machine, after being separated from the stems and unsound nuts.

N is a cap covering the front half of the top of the cylinder, to prevent the scattering of the nuts as they are separated from the vines by the teeth as the cylinder revolves.

O is a deflector for giving the proper direction to the current of wind, (see blue arrows.)

Operation.

This machine may be operated by two persons. The vines containing the nuts being placed on platform E, one man turns the crank, G, which operates the cylinder and fan, while the other operator places the vines upon the cylinder, holding each vine by the root-end until the nuts are separated by the action of the teeth, the vines passing between them, and are then thrown into a pile, to be gathered for food for cattle, and the nuts are conveyed by the cap N and apron L to the bottom apron M, by which, after being separated from the stems and unsound nuts, they are conducted to the front of the machine in a condition for sacking, as indicated by the red arrows in fig. 2 of the drawing.

The simplicity of the machine renders it very easy of operation, and free from liability to get out of order, while with it two men can accomplish as much in the same time as thirty men can by hand. More than two persons may be employed to advantage in operating the machine, and it may be increased in size and so constructed as to be operated by horse, water, or steam-power. A greater or less number of rows of teeth, arranged in parallel rows or otherwise, may be used, and the distance between the teeth varied as required.

*Claim.*

Having thus described my invention, what I claim therein as new, and desire to secure by Letters Patent, is—

A machine having a cylinder, D, provided with rows of teeth, $c\ c\ c\ c\ c$, in combination with the fan C, aprons L and M, and cap N, substantially in the manner and for the purpose as herein described.

JAMES C. UNDERWOOD.

Witnesses:
  W. BURRIS,
  H. H. YOUNG.